United States Patent [19]

Godbee et al.

[11] 3,764,552

[45] Oct. 9, 1973

[54] METHOD FOR STORING RADIOACTIVE COMBUSTIBLE WASTE

[75] Inventors: Herschel W. Godbee, Oak Ridge; Roy C. Lovelace, Lenoir City, both of Tenn.

[73] Assignee: The United States of America as represented by the United States Atomic Energy Commission, Washington, D.C.

[22] Filed: June 14, 1972

[21] Appl. No.: 262,802

[52] U.S. Cl............ 252/301.1 W, 252/182, 252/194
[51] Int. Cl............................................. C09k 3/00
[58] Field of Search................... 252/194, 301.1 W, 252/182, 476

[56] References Cited
UNITED STATES PATENTS 3,348,859  6/1969  Hall et al. ............................ 210/66
3,012,385  12/1961  Hufft....................... 252/301.1 W X
2,967,153  1/1961  Houston............................... 252/194

FOREIGN PATENTS OR APPLICATIONS 6,411,124  9/1964  Netherlands................ 252/301.1 W Primary Examiner—Carl D. Quarforth
Assistant Examiner—R. L. Tate
Attorney—Roland A. Anderson

[57] ABSTRACT

A method for preventing pressure buildup in sealed containers which contain radioactively contaminated combustible waste material by adding an oxide getter material to the container so as to chemically bind sorbed water and combustion product gases.

10 Claims, No Drawings

METHOD FOR STORING RADIOACTIVE COMBUSTIBLE WASTE

BACKGROUND OF THE INVENTION

This invention was made in the course of, or under, a contract with the United States Atomic Energy Commission.

The invention relates to methods for storing and handling radioactive wastes, and in particular, to the storage of radioactively contaminated combustible materials sealed in containers.

Wastes which consist essentially of solid materials contaminated with transuranium elements are generated during the production of nuclear fuel and in the fabrication of nuclear reactor fuel elements. These wastes which contain radioactive nuclides with extremely long half-lives would need to be contained in a remote location for hundreds of thousands of years to prevent exposure to living beings. Since efficient incineration or other methods are not yet available, the present solution to this problem is to package these materials in tightly sealed steel drums for transportation to, and storage in, a repository such as a salt mine. These wastes comprise a large combustible component, as large as two thirds by volume. The combustibles may include cellulosic materials, plastics, and various rubbers. These materials originate, for example, from disposal of contaminated clothing worn by plant personnel, contaminated construction material, such as paint and wood, and contaminated cleaning materials, such as paper towels and tissue paper. Approximately 200,000 cubic feet of this type of contaminated material are generated annually.

Thermal degradation and oxidation of the above materials yield gases, chiefly carbon dioxide and water. When these processes occur inside sealed containers, pressures of considerable magnitude occur. At temperatures which occur during storage and shipment, these pressures cannot only cause outleakage of gases but actual rupture of the containers.

SUMMARY OF THE INVENTION

It is thus an object of this invention to provide a method whereby contaminated combustible material may be safely stored in sealed containers for long periods of time without danger of container failure.

This object as well as other objects is accomplished according to this invention by adding an oxide getter material to the container along with the combustible material so as to react with and chemically bind combustion gases into the solid state.

DETAILED DESCRIPTION

According to this invention contaminated combustible material is hermetically sealed into steel drums along with at least a sufficient amount of an oxide getter material to react with all sorbed water and gases from combustion and pyrolysis. The term "combustible material" as used within this disclosure is defined as those materials which are solid at room temperature and which either pyrolyze or react with oxygen to form $H_2O$ and $CO_2$ as the principal reaction products. This includes many hydrocarbon and carbohydrate materials but the material of principal importance is cellulose and its derivatives because of the abundance of this type material as a contaminated waste.

Contaminated material which is disposed of according to this invention includes those materials which are defined by AEC Immediate Action Directive No. 0511-21, issued Mar. 20, 1970. This Directive requires that wastes from AEC sites with known or detectable contamination from transuranium nuclides be sagragated from other types of waste and stored in such a fashion that they can be retrieved as a contamination free package within an interim period of 20 years. This includes $^{239}Pu$ contamination of about 0.1 gram per cubic foot as well as transuranium concentrations of less than 0.1 $\mu Ci/ft^3$. Beta and gamma radiation from this type of waste is negligible and thus the waste may be handled by hand.

There are many oxide getter materials which are suitable for use in this invention. The principal criterion is that the oxide getter material readily react with $CO_2$ and $H_2O$ to form a solid carbonate and hydroxide. This type of oxide getter material will also react with incidental combustion gases such as volatile oxides of sulfur, nitrogen and phosphorus to form solid salts. Among the oxide getter materials which are operable in the method of this invention are CaO, SrO, MgO and BaO. However, from the standpoint of practicality and cost, CaO is the only suitable material.

The getter material is added to the container in an amount sufficient to react with sorbed water and gases formed by combustion and pyrolysis. The complete oxidation of pure cellulose would require that approximately 80 wt. % of the container's contents be CaO. However, there is only a limited amount of oxygen available for reaction, and this amount is normally not sufficient for complete oxidation. For best results and ease of operation it has been found that at least 20 wt. %, and preferably about 20 to 50 wt. %, CaO is necessary when a mixture of combustible materials is present.

In actual practice 30-, 55- and 83-gallon steel drums meeting DOT 17C and DOT 17H specifications, or equivalent, are used for storage. The waste material is preferably mixed with an appropriate amount of CaO and either compacted or loosely placed into the steel drums. It is preferred to compact the combustible waste material prior to or while loading the drums. Sufficient CaO may also be provided by forming CaO liners for the steel drums.

The additional safety and confinement capacity offered by the method of this invention is illustrated in the following example.

EXAMPLE

To evaluate the quantity of gas that may be given off by slow oxidation and degradation of combustible wastes in tightly sealed steel drums, a series of experiments were carried out in small drums with simulated typical combustible waste. The combustible material consisted of 25 wt. % blotter paper, 25 wt. % cheesecloth, 25 wt. % facial tissue, and 25 wt. % polyethylene film each cut into 1-inch squares. Mild-steel, 0.1-$ft^3$ drums with an open head, a bolt-ring closure, and a sealed rubber gasket similar to the 30-, 55- and 83-gallon drums used in practice were used for the experiment. The drums were modified by hermetically installing Chromel-Alumel thermocouples and pneumatic pressure monitoring devices to each drum. Tests were carried out in these small drums in an oven at temperatures ranging from 90°C to about 200°C. To assure uniform temperatures in the system, the drums were encased in a massive aluminum can. Selected representative results are given in the Table for the approximately 200°C temperature level--a level that might be expected during long-term storage in a repository. These results show that without the addition of a getter to the drum the gasket is breached when the pressure reaches about 4 atm. in the drum and that about 6 wt. % of the original waste is lost in about 50 hours of heating and about 12 wt. % in about 100 hours. Further, they show that with the addition of a getter (CaO) for water and carbon dioxide the pressure in the drum reaches only about 1.5 atm. (less than the pressure predicted for the expansion of the original air in the drum) and that the weight loss is only about 0.3 wt. % in about 200 hours. This small weight loss is accounted for by paint burning off of the drum exterior and solvent evaporating from a silicone-rubber sealant (glue) used on the gasket.

As is demonstrated in the above example, the process of this invention provides a reliable and economic method for storing radioactive combustible waste material.

terial, and hermetically sealing said material and said getter inside said container.

2. The method according to claim 1 wherein said oxide getter is CaO.

3. The method according to claim 2 wherein said CaO is present in an amount of at least 20 wt. % of the contents of said container.

4. The method according to claim 3 wherein said CaO is present in an amount of from 20 to 50 wt. %.

5. The method according to claim 1 wherein said material and said oxide getter are mixed together prior to said step of placing.

6. The method according to claim 5 wherein the mixture is compacted prior to said step of placing.

7. The method according to claim 1 wherein said step of providing comprises placing a liner of said oxide getter material inside said container.

8. The method according to claim 1 wherein said container is a mild-steel drum with an open head, a bolt-ring closure and a rubber gasket and said step of sealing comprises bolting said gasket and said closure to said head.

TABLE

| Run | Weight in drum (grams) Waste | Weight in drum (grams) Calcium oxide | Time (hours) To reach max. temp. | Time (hours) At max. temp. | Temp. (°C) Max. | Pressure (atmosphere, absolute) Max. observed | Pressure (atmosphere, absolute) Predicted from expansion of air [a] | Weight loss Grams | Weight loss Percent | Observations at end of run |
|---|---|---|---|---|---|---|---|---|---|---|
| 1 | 228 | 0 | 11 | 52 | 205 | 3.8 | 1.6 | 13.2 | 5.8 | Gasket breached. Solids are dark brown. Plastic has melted. |
| 2 | 228 | 0 | 11 | 105 | 200 | 4.0 | 1.6 | 26.7 | 11.7 | Gasket breached. Solids are dark brown. Plastic has melted. |
| 3 | 228 | 57 | 11 | 39 | 210 | [b] 1.4 | 1.6 | 0.5 | 0.2 | No apparent breach of gasket. Solids are light brown. Plastic has melted. |
| 4 | 228 | 114 | 11 | 205 | 210 | [b] 1.5 | 1.6 | 0.9 | 0.3 | No apparent breach of gasket. Solids are brown. |

[a] Calculated using $P = T/297$.
[b] The design pressure of a Department of Transportation Specification 17C drum is 2 atm.

What is claimed is:

1. A method for storing radioactive combustible waste material comprising the steps of placing said material into a container, providing within said container an oxide getter selected from the group consisting of MgO, CaO, BaO, and SrO, in an amount sufficient to react with sorbed water and with volatile combustion products formed by oxidation and pyrolysis of said ma- 9. The method according to claim 1 wherein said combustion products consist essentially of $H_2O$ and $CO_2$.

10. The method according to claim 1, wherein said combustible waste material is a solid at room temperature and either pyrolyzes or reacts with oxygen to form $H_2O$ and $CO_2$ as the principal product of reaction.

* * * * *